(12) United States Patent
Shah et al.

(10) Patent No.: US 8,756,069 B2
(45) Date of Patent: Jun. 17, 2014

(54) SYSTEMS AND METHODS FOR PROCESSING AND TRACKING ITEMS

(75) Inventors: Prathmesh S. Shah, Marietta, GA (US); Thomas Hosecloth, McDonough, GA (US)

(73) Assignee: United States Postal Service, Washington, DC (US)

( * ) Notice: Subject to any disclaimer, the term of this patent is extended or adjusted under 35 U.S.C. 154(b) by 1828 days.

(21) Appl. No.: 11/730,889

(22) Filed: Apr. 4, 2007

(65) Prior Publication Data

US 2008/0033848 A1 Feb. 7, 2008

Related U.S. Application Data

(63) Continuation of application No. 10/950,591, filed on Sep. 28, 2004, now abandoned, which is a continuation of application No. 10/474,740, filed as application No. PCT/US02/11520 on Apr. 15, 2002, now abandoned.

(60) Provisional application No. 60/283,351, filed on Apr. 13, 2001.

(51) Int. Cl.
| | | |
|---|---|---|
| G06Q 30/02 | (2012.01) | |
| G06Q 10/08 | (2012.01) | |
| G06Q 10/10 | (2012.01) | |
| G06Q 10/06 | (2012.01) | |
| G06Q 30/06 | (2012.01) | |

(52) U.S. Cl.
USPC ............ 705/1.1; 705/330; 705/333; 705/334

(58) Field of Classification Search
USPC .................................. 705/1.1, 330, 333, 334
See application file for complete search history.

(56) References Cited

U.S. PATENT DOCUMENTS

| | | | |
|---|---|---|---|
| 4,839,813 A | | 6/1989 | Hills et al. |
| 5,122,959 A | * | 6/1992 | Nathanson et al. ........... 701/117 |
| 5,233,532 A | | 8/1993 | Ramsden |
| 5,313,051 A | | 5/1994 | Brigida et al. |
| 5,485,369 A | * | 1/1996 | Nicholls et al. ................... 705/9 |

(Continued)

FOREIGN PATENT DOCUMENTS

| | | |
|---|---|---|
| JP | 2002-49664 | 2/2002 |
| JP | 2002-236726 | 8/2002 |
| WO | WO 95/30132 | 11/1995 |

OTHER PUBLICATIONS

International Search Report for PCT/US02/11520, dated Mar. 5, 2003.

(Continued)

*Primary Examiner* — Jonathan Ouellette
(74) *Attorney, Agent, or Firm* — Finnegan, Henderson, Farabow, Garrett & Dunner LLP

(57) ABSTRACT

Systems and methods for tracking items are provided. According to one method, a dispatcher receives from a courier, serving a customer, a request over a network to pickup an item addressed to the customer. A determination is made to see whether the dispatcher is available to process the item. If the dispatcher is available, the dispatcher notifies the courier, over the network, that the item is available for pickup by the courier when the dispatcher completes processing of the item. If the dispatcher is busy, the dispatcher notifies the courier, over the network, that the item is available for pick up by the courier at a later time.

21 Claims, 5 Drawing Sheets

(56) References Cited

U.S. PATENT DOCUMENTS

| | | | |
|---|---|---|---|
| 5,631,827 A | 5/1997 | Nicholls et al. | |
| 5,636,122 A * | 6/1997 | Shah et al. | 701/207 |
| 5,648,770 A * | 7/1997 | Ross | 340/994 |
| 5,818,336 A * | 10/1998 | Varga et al. | 340/545.1 |
| 5,983,202 A | 11/1999 | Yabe et al. | |
| 6,094,642 A | 7/2000 | Stephenson et al. | |
| 6,300,873 B1 * | 10/2001 | Kucharczyk et al. | 340/568.1 |
| 6,757,710 B2 * | 6/2004 | Reed | 709/203 |
| 7,158,941 B1 * | 1/2007 | Thompson | 705/8 |
| 7,277,866 B1 * | 10/2007 | Or-Bach et al. | 705/28 |
| 2002/0022983 A1 | 2/2002 | Barton | |
| 2002/0032623 A1 | 3/2002 | Wheeler et al. | |
| 2002/0065738 A1 | 5/2002 | Riggs et al. | |
| 2003/0182265 A1 * | 9/2003 | Robbins | 707/1 |
| 2004/0059623 A1 * | 3/2004 | Wolfe et al. | 705/9 |
| 2004/0124977 A1 * | 7/2004 | Biffar | 340/539.13 |
| 2007/0043698 A1 * | 2/2007 | Short et al. | 707/2 |

OTHER PUBLICATIONS

International Preliminary Examination Report for PCT/US02/115200, dated Nov. 18, 2003.

Dialog No. 02194473 (Frontline Solutions: "Bar Codes," vol. 2, No. 7, pp. 6-8 (2001).

* cited by examiner

SYSTEMS AND METHODS FOR PROCESSING AND TRACKING ITEMS

This is a continuation of application Ser. No. 10/950,591, filed Sep. 28, 2004 now abandoned, which is a continuation of application Ser. No. 10/474,740, filed Oct. 14, 2003 now abandoned, which is a National Stage Application of International Application No. PCT/US02/11520, filed Apr. 15, 2002, which claims priority to U.S. Provisional Application No. 60/283,351, filed Apr. 13, 2001, all of which are incorporated herein by reference.

TECHNICAL FIELD

The present invention relates to methods and systems for tracking items, such as mail, newspapers, or other merchandise.

BACKGROUND

Traditionally, item handling organizations, such as the United States Postal Service, have relied on manual tracking of one or more Items, such as remittance mail, to be delivered to a particular customer by a courier. Such manual tracking of items has caused several problems in serving the customers, including, for example, lack of information concerning whether a certain courier has picked up certain items for a particular customer.

Additionally, lack of tracking systems and methods have also caused delays for the couriers, who must wait in line, not knowing whether a dispatcher is available to process one or more items for a particular courier.

Accordingly, there is a need for systems and methods that address the above and other disadvantages of the prior art.

SUMMARY

Systems and methods are provided for tracking items. In one embodiment consistent with the present invention, a dispatcher receives from at least one courier serving at least one customer a request over a network to pickup one or more items addressed to the at least one customer. It is determined whether the dispatcher is available to process the one or more items. If the dispatcher is available, the dispatcher notifies the at least one courier over the network that the one or more items are available for pickup by the at least one courier when the dispatcher completes processing the one or more items. And if the dispatcher is busy, however, the dispatcher notifies the at least one courier over the network that the one or more items are available for pickup by the at least one courier at a later time.

In another embodiment consistent with the present invention, from at least one courier serving at least one customer a request is received over a network to pickup one or more items addressed to the at least one customer. Information is also received over the network concerning availability of at least one dispatcher to process the one or more items addressed to the at least one customer. If the at least one dispatcher is available, a notification is provided over the network to the at least one courier that one or more items are available for pickup by the at least one courier when the at the least one dispatcher completes processing the one or more items. If the at least one dispatcher is busy, however, a notification is provided over the network to the at least one courier that the one or more items are available for pickup by the at least one courier at a later time.

In yet another embodiment consistent with the present invention, a system comprises means for receiving from at least one courier serving at least one customer a request over a network to pickup one or more items addressed to the at least one customer. The system further comprises means for receiving over the network information concerning the availability of at least one dispatcher to process the one or more items addressed to the at least one customer. The system further comprises means for providing a notification over the network to the at least one courier that the one or more items are available for pickup by the at least one courier when the at least one dispatcher completes processing the one or more items. And the system further comprises means for providing over the network a notification to the at least one courier that the one or more items are available for pickup by the at least one courier at a later time, if the dispatcher is busy.

In another embodiment consistent with the present invention a system comprises a memory including code that: (1) receives from at least one courier serving at least one customer a request over a network to pickup one or more items addressed to the at least one customer, (2) receives over the network information concerning the availability of at least one dispatcher to process the one or more items addressed to the at least one customer, (3) if the at least one dispatcher is available, provides a notification to the at least one courier, over the network, that one or more items are available for pickup by the at least one courier when the at least one dispatcher completes processing the one or more items, and (4) if the at least one dispatcher is busy, provides a notification to the at least one courier over the network that the one or more items are available for pickup by the at least one courier at a later time. The system further comprises a processor that executes the code.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention. In the drawings.

DESCRIPTION OF THE EMBODIMENTS

Reference will now be made in detail to the exemplary embodiments consistent with the invention, examples of which are illustrated in the accompanying drawings. Wherever possible, the same reference numbers will be used throughout the drawings to refer to the same or like parts.

Systems and methods are provided for tracking items. Tracking of items may be desired in many environments, including for example, tracking mail for remittance customers. Remittance customers are customers that receive payment through the mail, for example, credit card companies, utility companies, or insurance companies. Because these remittance customers typically receive a high volume of mail on an hourly basis, they hire couriers to retrieve mail from, for example, a post office. Although the embodiments described below track items for remittance customers, the present invention is not so limited and may be applied to any situation involving tracking of other items, such as newspapers, books, or other merchandise.

Figure 1:
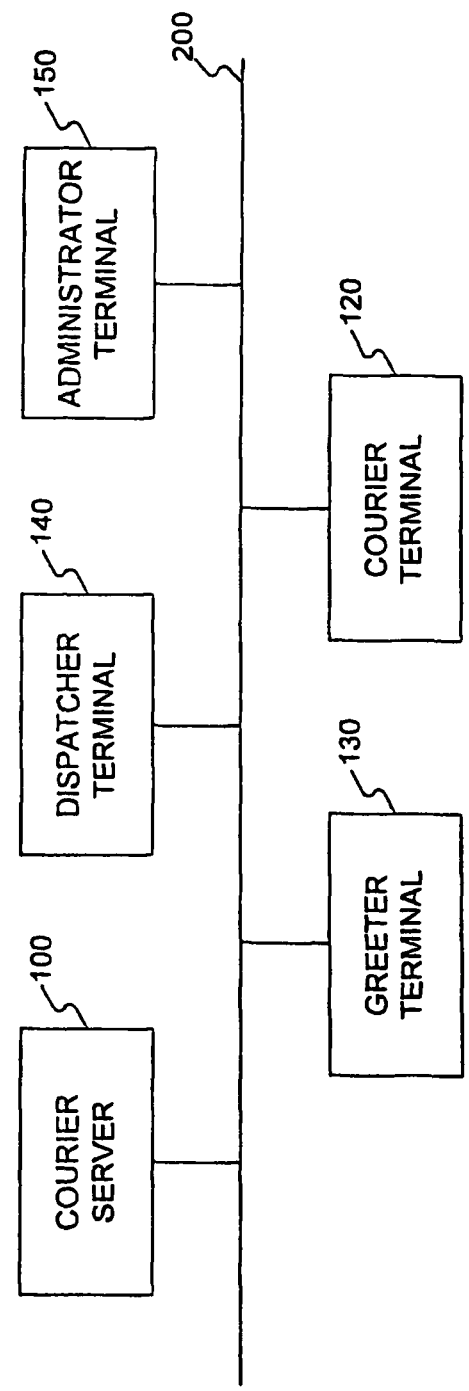
FIG. 1 shows an exemplary system consistent with the present invention.

FIG. 1 shows a system for tracking items consistent with the present invention. The system for tracking items may include a courier server 100, a courier terminal 120, a greeter terminal 130, a dispatcher terminal 140, and an administrator terminal 150. Courier server 100 may include software modules for implementing the logic related to the tracking of items. Each one of the terminals may be implemented using a personal computer, a thin computer, or a dumb terminal. The terminals may communicate over network 200, which may include a local area network (wired or wireless), the Internet, or any other network used to interconnect terminals.

In one embodiment, a courier may log into the system using courier terminal 120. The courier may then send a request to pickup one or more items addressed to a customer that the courier serves. The request may be sent via network 200 to dispatcher terminal 140. The system either automatically based on previously entered information concerning the availability of dispatchers or based on a manual input from a dispatcher, determines whether the dispatcher is available to process the request. A dispatcher or the system may then notify the courier concerning the status of the request, as discussed below. In one exemplary embodiment, greeter terminal 130 may be used by a greeter to enter information concerning a new courier. Administrator terminal 150 may be used to issue requests for reports concerning the system. It may also be used for other system management tasks.

Although FIG. 1 depicts terminals 120, 130, 140, and 150 as separate devices, all or some of the functionality of these terminals may be combined in any fashion. Thus, for example, the functionality of the courier terminal and the greeter terminal may be combined into a single terminal. Conversely, the functionality associated with each of the terminals may be distributed among other terminals (not shown).

Embodiments of the invention may be implemented in various system or network environments. Such environments and applications may be specially constructed for performing the various processes and operations of the embodiments of the invention or they may include a general-purpose computer or computing platform selectively activated or reconfigured by program code to provide the necessary functionality. The systems and methods disclosed herein are not inherently related to any particular computer or other apparatus, and may be implemented by a suitable combination of hardware, software, and/or firmware. For example, various general-purpose machines may be used with programs written in accordance with teachings of the embodiments of the invention, or it may be more convenient to construct a specialized apparatus or system to perform the required methods and techniques.

Embodiments of the invention also relate to computer readable media that include program instruction or program code for performing various computer-implemented operations based on the methods and processes of the embodiments. The media and program instructions may be those specially designed and constructed for the purposes of the embodiments of the invention, or they may be of the kind well known and available to those having skill in the computer software arts. Examples of program instructions include both machine code, such as produced by compiler, and files containing a high level code that can be executed by the computer using an interpreter.

Figure 2:
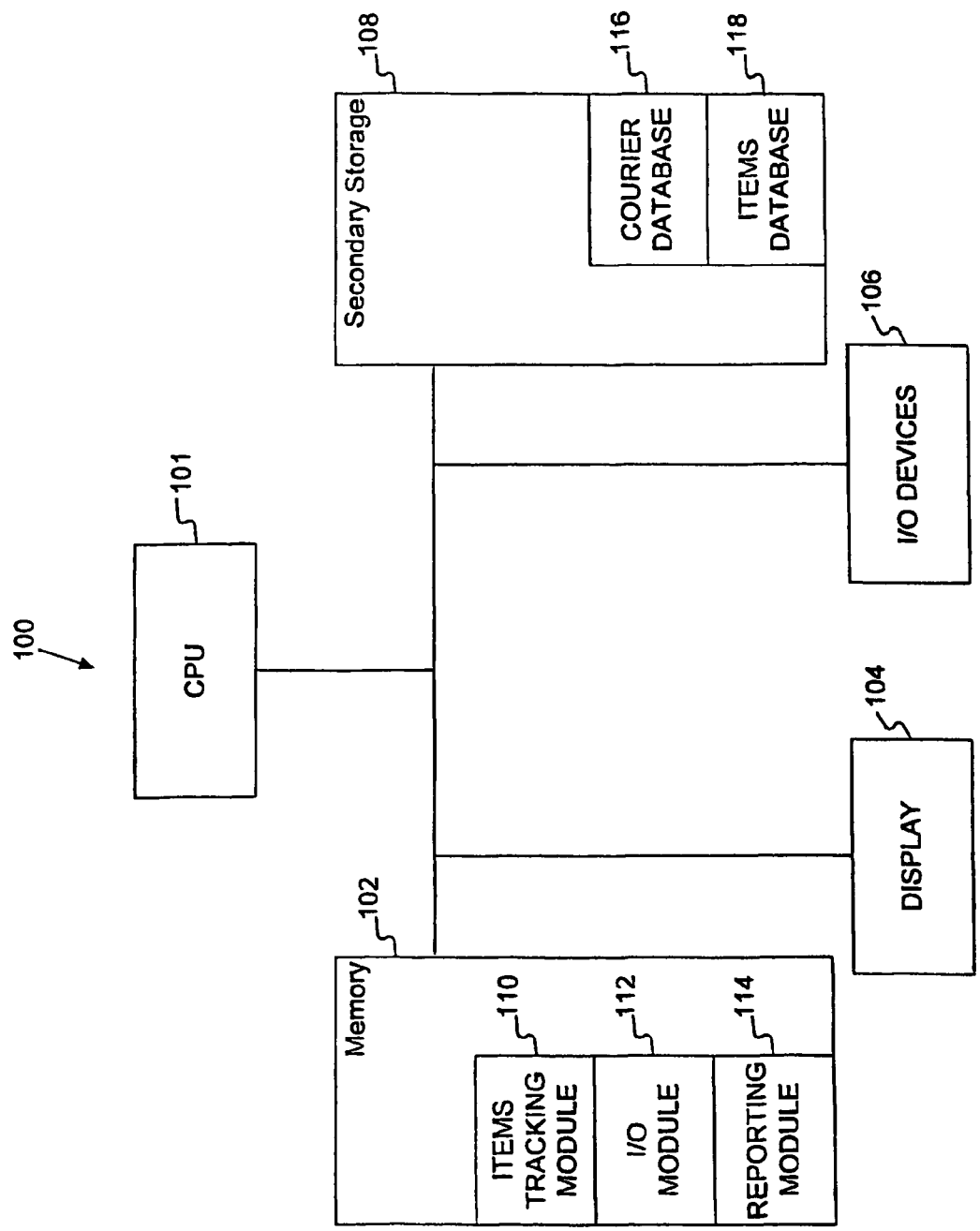
FIG. 2 shows an exemplary courier server consistent with the present invention.

FIG. 2 shows an exemplary courier server consistent with the present invention. Courier server 100 may include CPU 101, memory 102, display 104, I/O devices 106, secondary storage 108. Memory 102 may include items tracking module 110, I/O module 112, and reporting module 114. Each of these modules when executed by CPU 101 may provide the functionality corresponding to each of these modules. Tracking module 110 may include code for determining whether a dispatcher is available and for tracking the number of items picked up by a courier. I/O module 112 may, by itself or in combination with the operating system of the courier server, interface various terminals.

Although FIG. 2 depicts tracking module 110, I/O module 112, and reporting module 114 located in memory 102, each of these modules may be distributed over different memories. Conversely, these modules may be combined into a single memory.

Secondary storage 108 may include courier database 116 and items database 118. Courier database 116 may contain information concerning various couriers served by the system and it may further contain information concerning each customer served by each courier. Items database 118 may include information about items available for each courier, such as the number of items available for pickup by each courier. Either of these databases may be distributed over various storages. Alternatively, the two databases may be combined into a single database.

Figure 3:
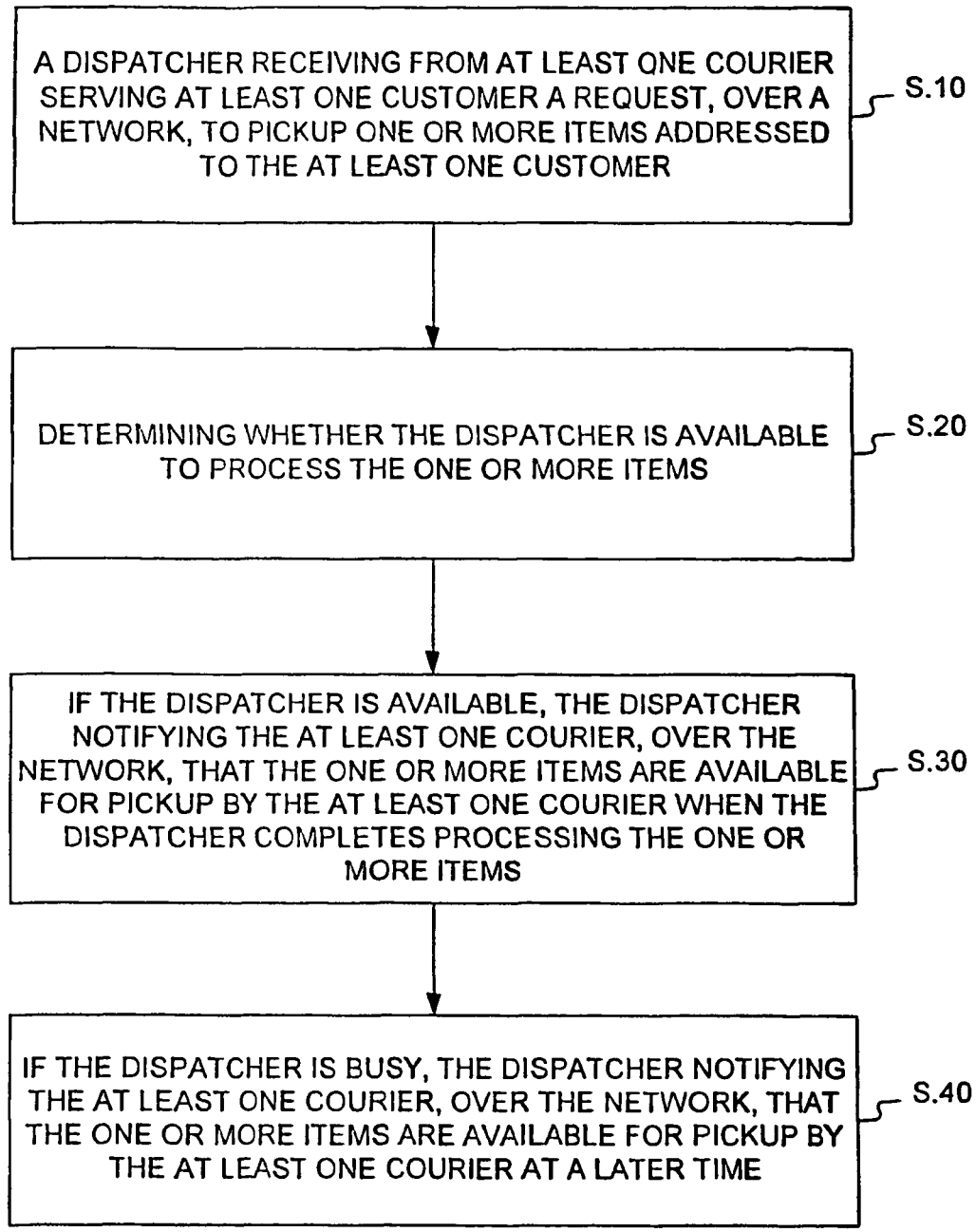
FIG. 3 shows a flowchart of an exemplary method for tracking items consistent with the present invention.

FIG. 3 shows a flowchart of an exemplary method for tracking items consistent with the present invention. As shown in FIG. 3, in step S.10 a dispatcher may receive from at least one courier serving at least one customer a request over network 200 (FIG. 1) to pickup one or more items addressed to the at least one customer. As used herein, the term dispatcher includes, but is not limited to, any person responsible for sorting items and retrieving those items that pertain to the request.

Next, a determination is made whether the dispatcher is available to process the items (step S.20). This determination may be made by the system, for example courier server 100, based on previously entered information, or alternatively, this determination may be made by a person, such as the dispatcher.

If the dispatcher is available, then the courier is notified over the network that the items are available for pickup by the courier when the dispatcher completes processing the items (step S.30).

If the dispatcher is busy, then the courier is notified over the network that the items are available for pickup at a later time by the courier (step S.40). Notifying the courier may further include providing an estimated later time for pickup.

Consistent with the present invention, the number of items picked up by the courier may be tracked. Tracking the items may further include storing information concerning the items picked up by the courier. Such information may be stored, for example, in items database 118. Using relational database management techniques, such information may be linked to courier database 116. Further, tracking the items may also include storing information concerning the items remaining to be picked up by the courier. As above, such information may be stored, for example, in items database 118.

Additionally, the system of FIG. 1 and FIG. 2 may also generate reports concerning the items available for pickup and concerning one or more items picked up by the courier.

Such reports may be generated, using, for example, reporting module 114 of FIG. 2. Further, reports concerning the items picked up by the courier may automatically be generated as part of tracking the items.

The exemplary method shown in FIG. 3 may further include assigning at least one color-coded bag to the courier for storing misdirected items. Misdirected items may include those items, which for example, were mistakenly picked up by the courier. The tracking method may further include receiving such misdirected items from the courier. Additionally, the method may further include determining the reasons for the misdirecting of the items.

The method of FIG. 3 may further include scheduling times for pickup by the courier based on flow pattern of one or more items. Thus, for example, using tracking module 110 one may keep track of the volume of the flow of items for a particular customer. Tracking module 110 may overtime permit the discovery of a pattern regarding the flow of items for a particular customer. Thus, for example, by tracking the volume of the items for a particular customer, it may be determined that a high volume of items are processed for the particular customer at a particular time of the day. This information may further be used to schedule pickups by the courier serving the particular customer.

Figure 4:
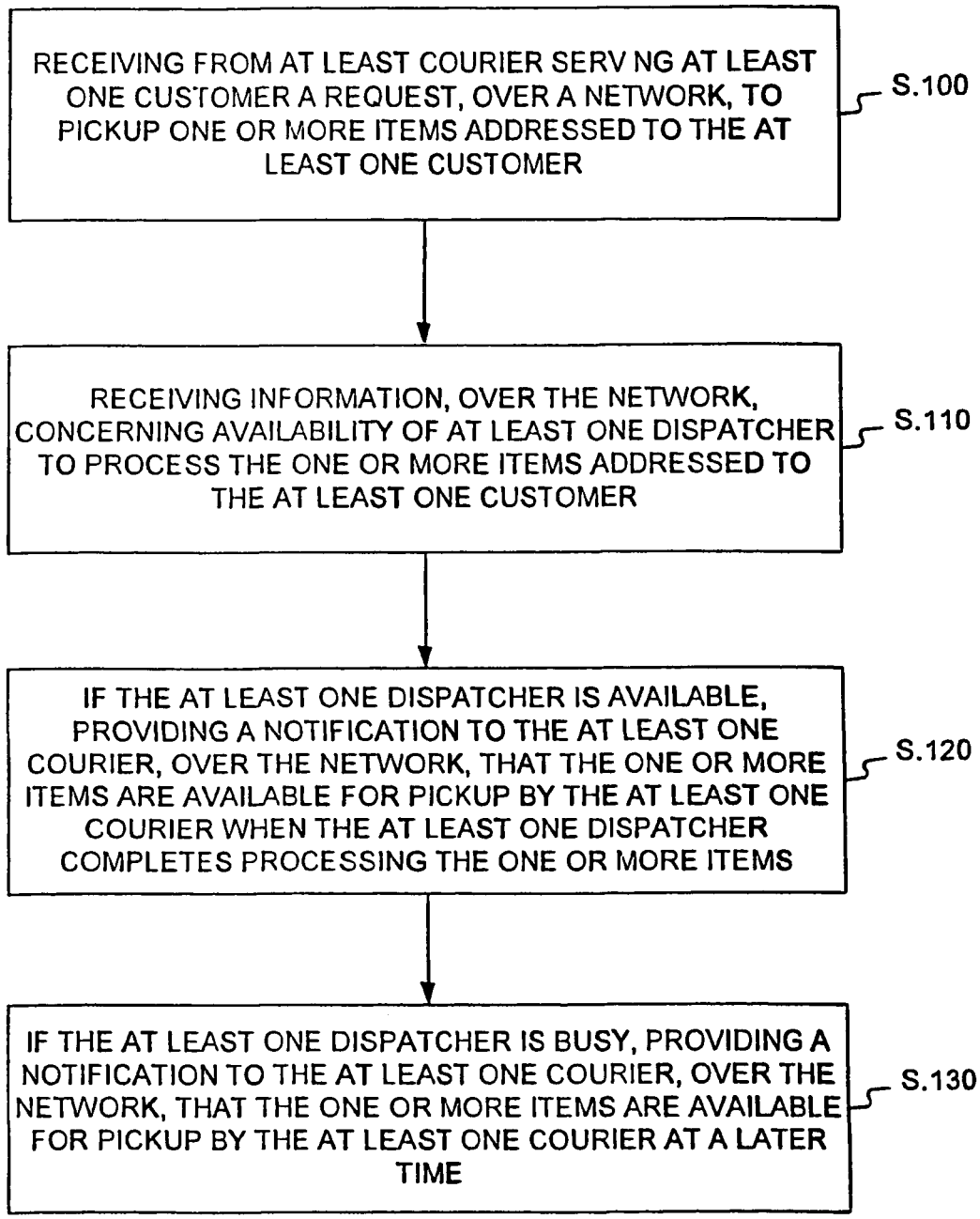
FIG. 4 shows a flowchart of an exemplary method for tracking items consistent with the present invention.

FIG. 4 shows a flowchart of an exemplary method for tracking items consistent with the present invention. From at least one courier serving at least one customer, a request to pickup one or more items addressed to the customer is received (step S.100). Using courier terminal 120, the courier may send the request to courier server 100 over network 200. Items tracking module 110, resident in courier server 100, may then send the request to dispatcher terminal 140 via I/O module 112.

Next, information concerning the availability of at least one dispatcher to process the items addressed to the at least one customer may be received over the network (step S.110). A dispatcher, using dispatcher terminal 140, may send over network 200 information concerning the availability of the dispatcher to courier server 100. Alternatively, the dispatcher availability information may be determined by the courier server 100 based on previously stored information. Courier server 100 may then send the availability information over network 200 to courier terminal 120.

If the dispatcher is available, a notification may be sent over network 200 indicating that items are available for pick up by the courier when the dispatcher completes processing the items (step S.120). A dispatcher may send this information, using dispatcher terminal 140, over network 200 to courier server 100. Alternatively, items tracking module 110, resident in courier server 100, may generate a notification based or previously stored information about dispatcher availability. Courier server 100 may then send the notification over network 200 to courier terminal 120.

If the dispatcher is busy, a notification may be sent over network 200 indicating that the items are available for pickup by the courier at a later time (step S.130). A dispatcher may send this information, using dispatcher terminal 140, over network 200 to courier server 100. Alternatively, items tracking module 110, resident in courier server 100, may generate a notification based or previously stored information about dispatcher availability. Courier server 100 may then send the notification over network 200 to courier terminal 120.

Consistent with the present invention, a system for tracking items is also provided. The system comprises means for receiving from at least one courier serving at least-one customer a request over a network to pickup one or more items addressed to the at least one customer. The request may be received over network 200 of FIG. 1 via, for example, courier terminal 120 and dispatcher terminal 140. The system further comprises means for receiving over the network information concerning the availability of at least one dispatcher to process the items addressed to the at least one customer. Information concerning the availability of the dispatcher may be received over network 200. The system further comprises means for providing a notification over the network to the courier that the items are available for pickup by the courier when the dispatcher completes processing the items. Such a notification may be provided over network 200 via, for example, courier terminal 120 and dispatcher terminal 140. And the system further comprises means for providing a notification over the network to the courier that the items are available for pickup by the courier at a later time, if the dispatcher is busy.

The exemplary system described above may further include means for tracking the number of items picked up by the courier. In one embodiment, the means for tracking the number of items may comprise items tracking module 110. The system may further include means for storing information concerning the items picked up by the courier. In one embodiment, the means for storing information may comprise items database 118. Further, the system may also include means for storing information concerning items available for pickup by the courier.

The system for tracking items may further comprise means for generating reports concerning the items picked up by the courier. In one embodiment the means for generating reports may comprise reporting module 114.

Figure 5:
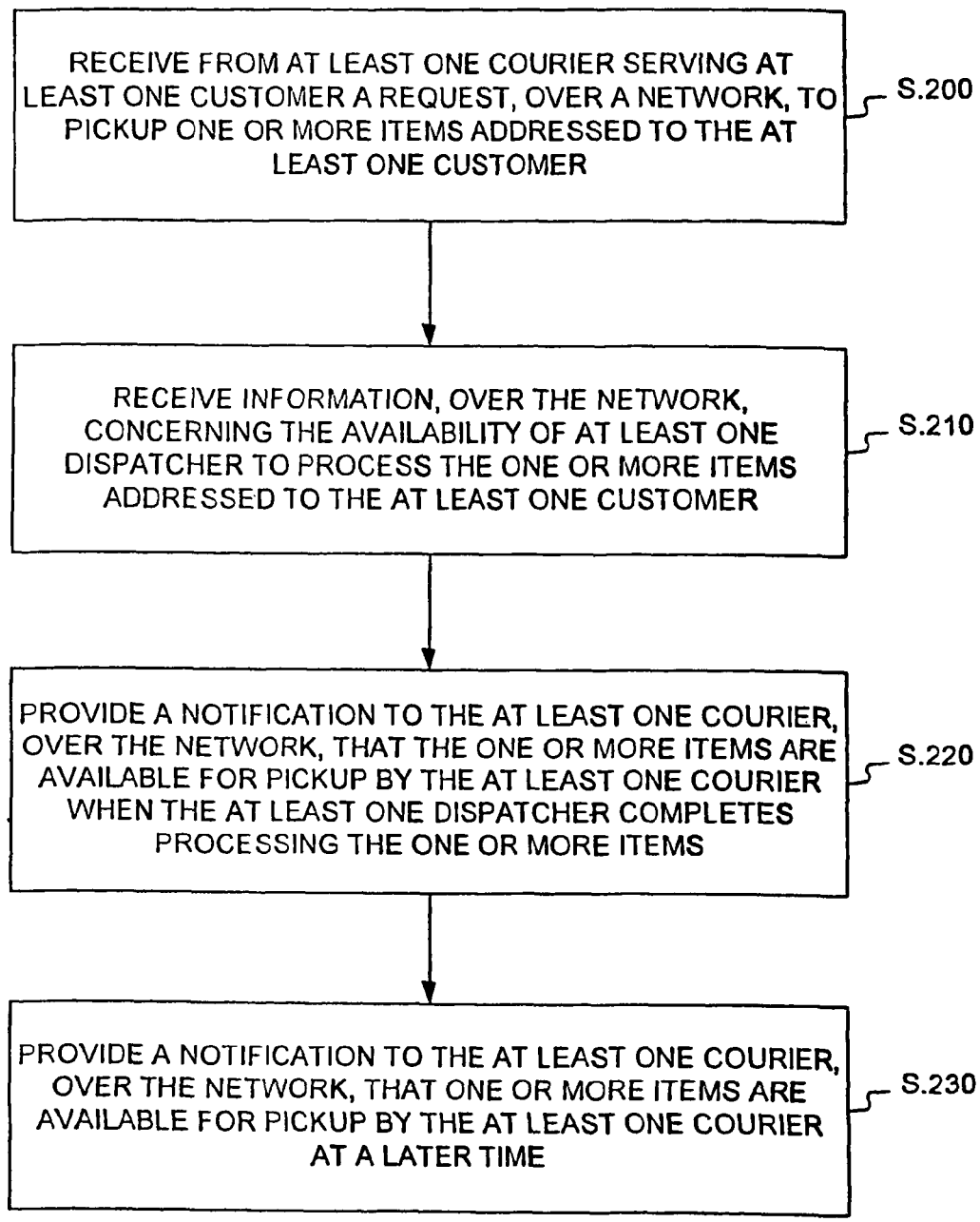
FIG. 5 shows a flowchart corresponding to exemplary code for tracking items consistent with the present invention.

In an another embodiment consistent a system comprises a memory including code and a processor for executing the code. As shown in FIG. 5, the code may receive from at least one courier serving at least one customer a request over a network to pickup one or more items addressed to the at least one customer (step S.200). The code may further receive over the network information concerning the availability of at least one dispatcher to process the items addressed to the at least one customer (step S.210). The code may provide a notification over the network to the courier that the items are available for pickup by the courier when the dispatcher completes processing the items (step S.220). And the code may provide a notification over the network to the courier that the items are available for pickup by the courier at a later time, if the dispatcher is busy (step S.230).

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for processing items, the method comprising:

receiving a request by a computer of a dispatcher, from a courier over a network, to pick up one or more items addressed to at least one customer which the courier serves;

determining, by the dispatcher computer, whether the dispatcher is available to process the one or more items;

if the dispatcher is available, sending a message to the courier, by the dispatcher computer over the network, that the one or more items are available for pickup when the dispatcher completes processing of the one or more items;

if the dispatcher is busy, sending a message to the courier, by the dispatcher computer over the network, providing an estimated time for later pickup;

tracking a volume of a flow of items to the at least one customer;

determining a flow pattern based at least in part on the flow of items to the at least one customer; and scheduling at least one time for pickup by the courier based at least in part on the flow pattern of items to the at least one customer.

2. The computer-implemented method of claim 1, the method further comprising:

picking up the one or more items by the courier and tracking the items picked up by the at least one courier.

3. The computer-implemented method of claim 2, wherein tracking comprises:

storing information concerning the items picked up by the courier on a storage medium.

4. The computer-implemented method of claim 2, wherein tracking comprises storing information within the network concerning items remaining to be picked up by the courier.

5. The computer-implemented method of claim 1, the method further comprising generating reports concerning the items available for pickup.

6. The computer-implemented method of claim 2, the method further comprising generating reports concerning the items picked up by the courier.

7. The computer-implemented method of claim 3, the method further comprising assigning at least one color-coded bag to the courier for storing misdirected items.

8. The computer-implemented method of claim 7, the method further comprising receiving misdirected items from the at least one courier.

9. The computer-implemented method of claim 8, the method further comprising determining one or more reasons for the misdirection.

10. A method for processing items, the method comprising:

receiving from a courier serving at least one customer, a request over a network to pick up one or more items addressed to the at feast one customer;

receiving over the network information concerning availability of at least one dispatcher to process the one or more items addressed to the at least one customer;

if the at least one dispatcher is available, providing a notification to the at least one courier, over the network, that the one or more items are available for pickup by the at least one courier when the at the least one dispatcher completes processing the one or more items;

if the at least one dispatcher is busy, providing a notification to the at least one courier, over the network, comprising an estimated later time for pickup;

tracking a volume of a flow of items to the at least one customer;

determining, by a tracking module, a flow pattern based at least in part on the flow of items to the at least one customer; and scheduling at least one time for pickup by the courier based at least in part on the flow pattern of items to the at least one customer.

11. The method of claim 10, further comprising picking up the one or more items by the courier and tracking a number of the items picked up by the courier.

12. The method of claim 11, wherein tracking comprises; storing information concerning the one or more items picked up by the courier on a storage medium.

13. The method of claim 11, wherein tracking comprises storing information within the network concerning items remaining to be picked up by the courier.

14. The method of claim 10 further comprising generating reports concerning the one or more items available for pickup.

15. The method of claim 11, further comprising generating reports concerning the one or more items picked up by the courier.

16. A system for processing items, the system comprising:

a request receiving unit that receives from at least one courier serving at least one customer a request over a network to pick up one or more items addressed to the at least one customer;

an availability receiving unit that receives over the network information concerning the availability of at least one dispatcher to process the one or more items addressed to the at least one customer;

a pick up availability unit that provides a notification over the network to the at least one courier that one or more items are available for pickup by the at least one courier when the at least one dispatcher completes processing the one or more items;

a notification unit that provides a notification over the network to the at least one courier comprising an estimated later time for pickup;

a tracking unit that tracks a volume of a flow of items to the at least one customer;

a determining unit that determines a flow pattern based at least in part on the flow of items to the at least one customer; and a scheduling unit that schedules at least one time for pickup by the courier based at least in part on the flow pattern of items to the at least one customer.

17. The system of claim 16 further comprising a pick up unit that picks up the one or more items by the courier and a tracking unit that tracks a number of the items picked up by the at least one courier.

18. The system of claim 17, wherein the tracking unit stores information concerning the items picked up by the at least one courier.

19. The system of claim 16, wherein the tracking unit stores information concerning one or more items remaining to be picked up by the at least courier.

20. The system of claim 18, further comprising a report generating unit that generates reports concerning the one or more items picked up by the at least one courier.

21. A system comprising:

a memory including code that:

receives from at least one courier serving at least one customer a request, over a network, to pickup one or more items addressed to the at least one customer, receives over the network information concerning the availability of at least one dispatcher to process the one or more items addressed to the at least one customer, wherein processed items are available for pickup by the courier and processing tracks the items to at least the courier, if the at least one dispatcher is available, provides a notification over the network to the at least one courier that one or more items are available for pickup by the at least one courier when the at least one dispatcher completes processing the one or more items, if the at least one dispatcher is busy, provides a notification over the network to the at least one courier comprising an estimated later time for pickup;

tracks a volume of a flow of items to the at least one customer;

determines a flow pattern based at least in part on the flow of items to the at least one customer; and
schedules at least one time for pickup by the courier based at least in part on the flow pattern of items to the at least one customer; and
a processor that executes the code.

* * * * *

UNITED STATES PATENT AND TRADEMARK OFFICE
CERTIFICATE OF CORRECTION

PATENT NO. : 8,756,069 B2  
APPLICATION NO. : 11/730889  
DATED : June 17, 2014  
INVENTOR(S) : Prathmesh S. Shah and Thomas Hosecloth It is certified that error appears in the above-identified patent and that said Letters Patent is hereby corrected as shown below:

Title Page, Item (57):

Abstract, lines 3-4, "to pickup an item" should read --to pick up an item--.

Abstract, line 10, "available for pick up" should read --available for pickup--.

In the Claims:

Claim 10, col. 7, line 42, "at feast" should read --at least--.

Claim 16, col. 8, line 18, "a pick up availability unit" should read --a pickup availability unit--.

Claim 21, col. 8, line 50, "to pickup one or more" should read --to pick up one or more--.

Signed and Sealed this  
Seventh Day of October, 2014

Michelle K. Lee  
*Deputy Director of the United States Patent and Trademark Office*